United States Patent
Shoji

(10) Patent No.: US 11,654,760 B2
(45) Date of Patent: May 23, 2023

(54) SEAL STRUCTURE OF VEHICLE OPENING

(71) Applicant: AISIN CORPORATION, Kariya (JP)

(72) Inventor: Akitoshi Shoji, Kariya (JP)

(73) Assignee: Aisin Corporation, Aichi (JP)

( * ) Notice: Subject to any disclaimer, the term of this patent is extended or adjusted under 35 U.S.C. 154(b) by 231 days.

(21) Appl. No.: 17/116,323

(22) Filed: Dec. 9, 2020

(65) Prior Publication Data
US 2021/0197652 A1 Jul. 1, 2021

(30) Foreign Application Priority Data

Dec. 25, 2019 (JP) .............................. JP2019-234610

(51) Int. Cl.
*B60J 10/90* (2016.01)
*B60J 10/27* (2016.01)
(Continued)

(52) U.S. Cl.
CPC ............... *B60J 10/90* (2016.02); *B60J 10/15* (2016.02); *B60J 10/27* (2016.02); *B60J 10/2335* (2016.02);
(Continued)

(58) Field of Classification Search
CPC ... B60J 10/00; B60J 10/10; B60J 10/15; B60J 10/21; B60J 10/27; B60J 10/30;
(Continued)

(56) References Cited

U.S. PATENT DOCUMENTS 4,765,677 A * 8/1988 Nagata ..................... B60J 10/82
52/716.5
5,010,691 A * 4/1991 Takahashi .............. B60J 10/277
49/490.1
(Continued)

FOREIGN PATENT DOCUMENTS

CN 110001368 A * 7/2019 .............. B60J 10/30
JP 2001-310685 A 11/2001
(Continued)

OTHER PUBLICATIONS

Kiyama et al., "Door Weather Strip", Edition: JP6280883B2, Feb. 2018, Japanese Patent Office (Year: 2018).*
(Continued)

*Primary Examiner* — Dennis H Redder
*Assistant Examiner* — Joyce Eileen Hill
(74) *Attorney, Agent, or Firm* — Finnegan, Henderson, Farabow, Garrett & Dunner, LLP

(57) ABSTRACT

A seal structure is applied to a vehicle including a vehicle body that includes a roof opening, and a movable panel and a fixed panel that close the roof opening. The seal structure includes a flange extending along an opening edge of the roof opening, and a weather strip that includes a holding groove into which the flange is inserted, and blocks a gap generated between the vehicle body, and the movable panel and the fixed panel. A tip of the flange includes a plurality of notches with respect to an extending direction of the flange. The weather strip includes an inner wall and an outer
(Continued)

wall facing each other across the holding groove, and a connection wall that connects the inner wall and the outer wall in a position corresponding to the notch.

8 Claims, 6 Drawing Sheets

(51) Int. Cl.
  *B60J 10/15* (2016.01)
  *B60J 10/23* (2016.01)
  *B60J 10/30* (2016.01)
  *B60J 10/82* (2016.01)
  *B60J 10/24* (2016.01)
  *B60J 10/86* (2016.01)
  *B60J 10/248* (2016.01)

(52) U.S. Cl.
  CPC .............. *B60J 10/24* (2016.02); *B60J 10/248* (2016.02); *B60J 10/30* (2016.02); *B60J 10/82* (2016.02); *B60J 10/86* (2016.02)

(58) Field of Classification Search
  CPC ... B60J 10/32; B60J 10/33; B60J 10/80; B60J 10/82; B60J 10/86; B60J 10/90; B60J 10/248; B60J 10/2335
  USPC ......... 296/216.06, 216.07, 216.08; 49/479.1, 49/484.1
  See application file for complete search history.

(56) References Cited

U.S. PATENT DOCUMENTS

| | | | | |
|---|---|---|---|---|
| 5,050,928 A | * | 9/1991 | Bohm | B60J 10/82 49/490.1 |
| 5,170,587 A | * | 12/1992 | Nakatani | B60J 10/82 49/490.1 |
| 6,598,347 B2 | | 7/2003 | Hattori | |
| 2014/0203597 A1 | * | 7/2014 | Kikuchi | B60J 7/0435 296/222 |

FOREIGN PATENT DOCUMENTS

| | | | |
|---|---|---|---|
| JP | 2011-093416 A | 5/2011 | |
| JP | 2011-093417 A | 5/2011 | |
| JP | 6280883 B2 * | 2/2018 | .............. B60J 10/86 |

OTHER PUBLICATIONS

Huang et al., "Two-way sealing device for vehicle skylight", Edition: CN110001368A, Jul. 12, 2019, Chinese Patent Office (Year: 2019).*

* cited by examiner

SEAL STRUCTURE OF VEHICLE OPENING

CROSS REFERENCE TO RELATED APPLICATIONS

This application is based on and claims priority under 35 U.S.C. § 119 to Japanese Patent Application 2019-234610, filed on Dec. 25, 2019, the entire content of which is incorporated herein by reference.

TECHNICAL FIELD

This disclosure generally relates to a seal structure of a vehicle opening.

BACKGROUND DISCUSSION

JP2011-93416A (Reference 1) describes a seal structure of a vehicle opening including a flange portion formed along a peripheral edge of an opening of a vehicle body, and a weather strip attached to the flange portion. An insert that forms a substantially U-shape as a cross-sectional shape being orthogonal to a long-side direction of the weather strip and is made of metal is buried in the weather strip. Then, the insert of the weather strip sandwiches the flange portion, and thus an attitude of the weather strip with respect to the flange portion is stabilized.

Since the insert is buried in the weather strip in the seal structure as described above, there is room for improvement in a point of simplifying the structure.

A need thus exists for a seal structure of a vehicle opening which is not susceptible to the drawback mentioned above.

SUMMARY

A seal structure of a vehicle opening that solves the problem described above is applied to a vehicle including a vehicle body that includes an opening, and a closing body that closes the opening, and the seal structure of a vehicle opening includes a flange extending along an opening edge of the opening, and a weather strip that includes a holding groove into which the flange is inserted, and blocks a gap generated between the vehicle body and the closing body. A tip of the flange includes a plurality of notches with respect to an extending direction of the flange. The weather strip includes an inner wall and an outer wall facing each other across the holding groove, and a plurality of connection walls that connect the inner wall and the outer wall in a position corresponding to the plurality of notches.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A vehicle to which a seal structure of a vehicle opening (hereinafter, referred to as a "seal structure") according to an embodiment is applied will be described below with reference to the drawings.

Figure 1:
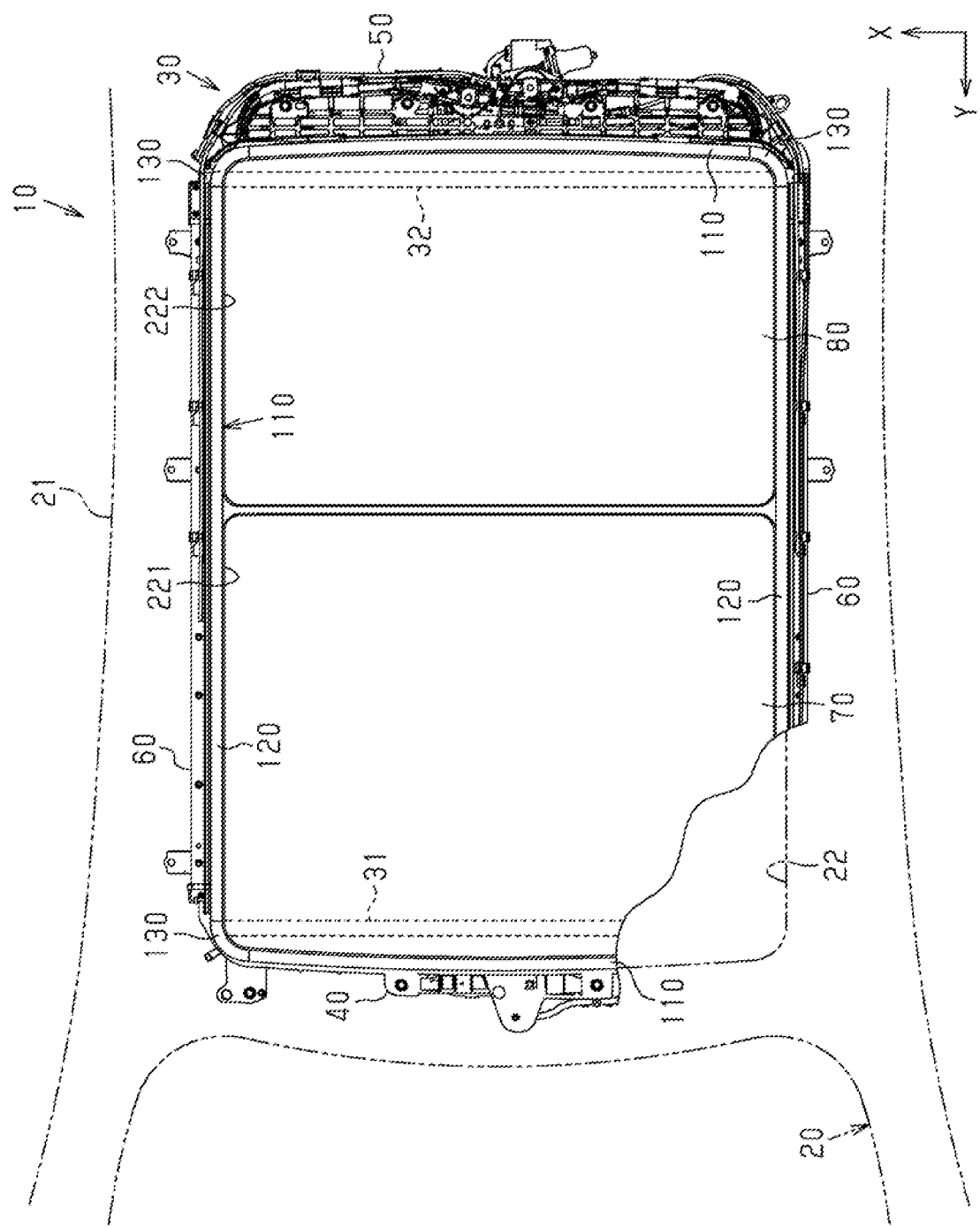
FIG. 1 is a plan view of a vehicle to which a seal structure according to an embodiment is applied.

As illustrated in FIG. 1, a vehicle 10 includes a vehicle body 20 including a roof 21, and a sunroof unit 30 disposed on the roof 21. In the following description, an axis extending in a width direction of the vehicle 10 is indicated by an X axis, an axis extending in a front-rear direction of the vehicle 10 is indicated by a Y axis, and an axis extending in an up-down direction of the vehicle 10 is indicated by a Z axis. The width direction, the front-rear direction, and the up-down direction are orthogonal to one another.

The roof 21 has a substantially rectangular shape having the front-rear direction as a long-side direction and having the width direction as a short-side direction. The roof 21 may be curved with respect to the width direction, and may be curved with respect to the front-rear direction. The roof 21 includes a roof opening 22 as one example of an "opening". The roof opening 22 is provided across most of the roof 21. Similarly to the roof 21, the roof opening 22 has a substantially rectangular shape having the front-rear direction as a long-side direction and having the width direction as a short-side direction.

The sunroof unit 30 includes a front frame 31 and a rear frame 32 extending in the width direction, a front housing 40 constituting a front portion of the sunroof unit 30, a rear housing 50 constituting a rear portion of the sunroof unit 30, and a pair of side frames 60 extending in the front-rear direction. Further, the sunroof unit 30 includes a movable panel 70 of a movable type, a fixed panel 80 of a fixed type, and a weather strip 100 that blocks a gap between the vehicle body 20, and the movable panel 70 and the fixed panel 80.

The front frame 31 and the rear frame 32 extend along a front end and a rear end of the roof opening 22, respectively. The front frame 31 and the rear frame 32 are, for example, an extrusion molded product formed of a metal material.

The front housing 40 and the rear housing 50 extend along the front end and the rear end of the roof opening 22, respectively. The front housing 40 and the rear housing 50 are, for example, an injection molded product formed of a resin material.

Figure 2:
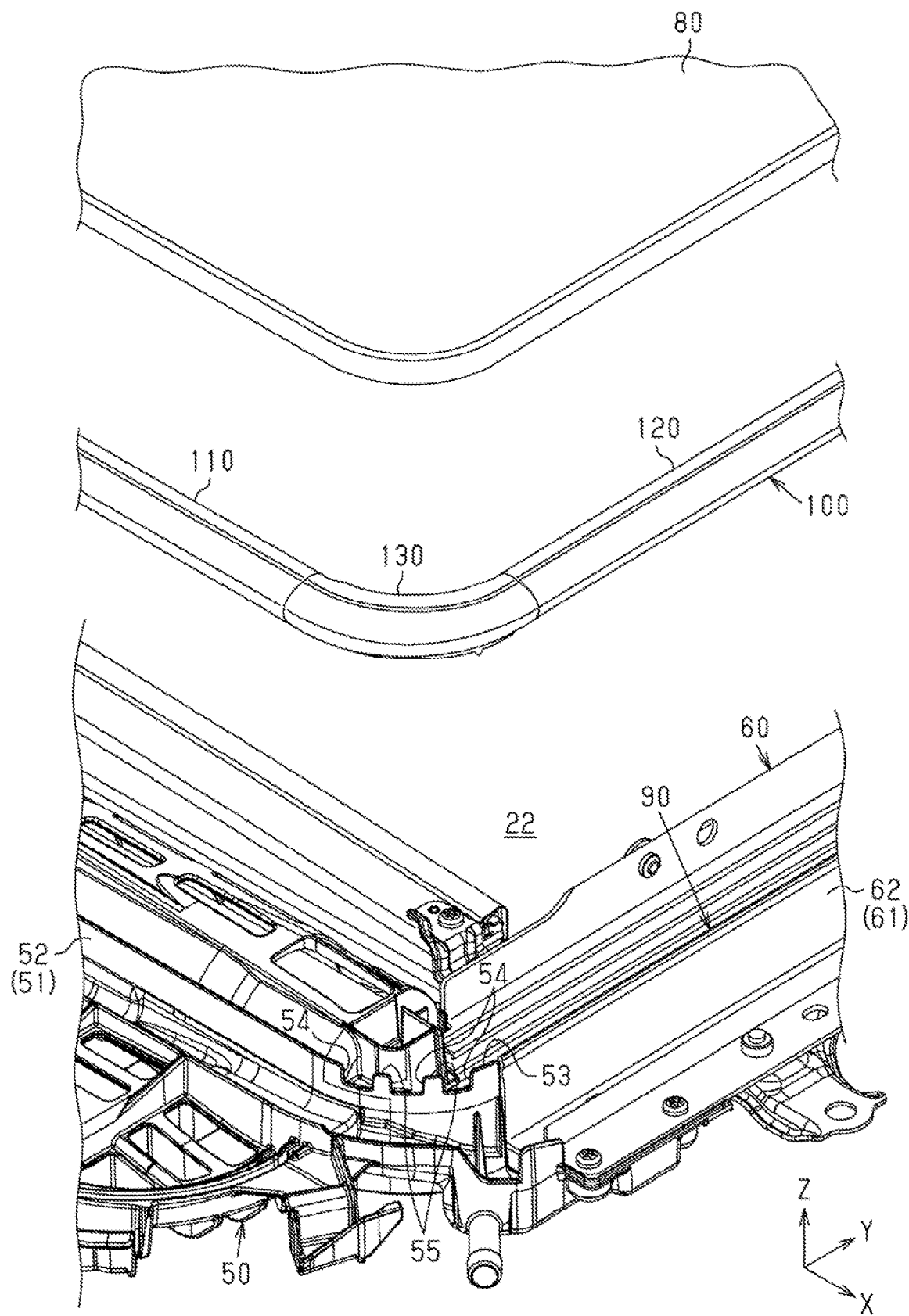
FIG. 2 is a partial exploded perspective view of a sunroof unit included in the vehicle.

As illustrated in FIG. 2, the rear housing 50 includes a rear flange 51 extending upward. The rear flange 51 includes a linear portion 52 extending in the width direction, and a pair of curved portions 53 being curved so as to go forward as heading outward in the width direction. The pair of curved portions 53 each extend from each of both sides of the linear portion 52 in the width direction. In a plan view from above the rear housing 50, the linear portion 52 has a linear shape, and the curved portion 53 has an arc shape. In this way, the rear flange 51 extends along the roof opening 22.

A tip of the curved portion 53 includes a plurality of notches 54 aligned in a direction in which the rear flange 51 extends. The notch 54 has a substantially rectangular shape when seen from a diameter direction of the curved portion 53. When a portion between the adjacent notches 54 is assumed to be a protrusion 55 in the curved portion 53, a width of the notch 54 is greater than a width of the protrusion 55 in a circumferential direction of the curved portion 53. Although not illustrated, the front housing 40 includes a front flange equal to the rear flange 51 of the rear housing 50.

As illustrated in FIG. 1, the pair of the side frames 60 each extend along each of both side ends of the roof opening 22. The side frame 60 is, for example, an extrusion molded product formed of a metal material. The pair of the side frames 60 connect both end portions of the front frame 31 and both end portions of the rear frame 32. As illustrated in FIG. 2, the side frame 60 includes a side flange 61 extending upward. The side flange 61 extends in a long-side direction of the side frame 60, i.e., along the roof opening 22.

The side flange 61 includes a linear portion 62 extending in the front-rear direction. When the side frame 60 is coupled to the rear housing 50, the side flange 61 of the side frame 60 is connected to the curved portion 53 of the rear flange 51 of the rear housing 50. Specifically, the linear portion 62 of the side flange 61 is connected to the linear portion 52 of the rear flange 51 via the curved portion 53 of the rear flange 51. In this respect, in the present embodiment, the linear portion 52 of the rear housing 50 corresponds to one example of a "first linear portion", and the linear portion 62 of the side flange 61 corresponds to one example of a "second linear portion". Note that, in a situation where the side flange 61 of the side frame 60 and the rear flange 51 of the rear housing 50 are connected to each other, an end surface of the side flange 61 and an end surface of the rear flange 51 do not necessarily need to be in contact. In other words, it is assumed that a connection manner of the side flange 61 and the rear flange 51 includes a case where a slight gap is generated between the side flange 61 and the rear flange 51.

In the present embodiment, both ends of the front flange of the front housing 40 and the side flanges 61 of the pair of the side frames 60 are connected to each other on both sides in the width direction. Further, both ends of the rear flange 51 of the rear housing 50 and the side flanges 61 of the pair of the side frames 60 are connected to each other on both sides in the width direction. In the following description, the front flange, the rear flange 51, and the pair of the side flanges 61 are included to be also simply referred to as a "flange 90". Further, in the present embodiment, one example of a "seal structure" including the flange 90 and the weather strip 100 is constituted.

As illustrated in FIG. 1, the movable panel 70 opens and closes a first opening 221 partitioned by the front housing 40 and the pair of the side frames 60. For example, the movable panel 70 opens and closes the first opening 221 by a functional component moving along the pair of the side frames 60. A weather strip that blocks a gap generated between a front end of the fixed panel 80 and the movable panel 70 is preferably installed on a rear end of the movable panel 70. On the other hand, the fixed panel 80 closes a second opening 222 partitioned by the rear housing 50 and the pair of the side frames 60. In other words, the fixed panel 80 is fixed to the rear housing 50 and the pair of the side frames 60. In the present embodiment, the movable panel 70 and the fixed panel 80 correspond to one example of a "closing body". Further, the first opening 221 is a front opening, and the second opening 222 is a rear opening.

Figure 5:
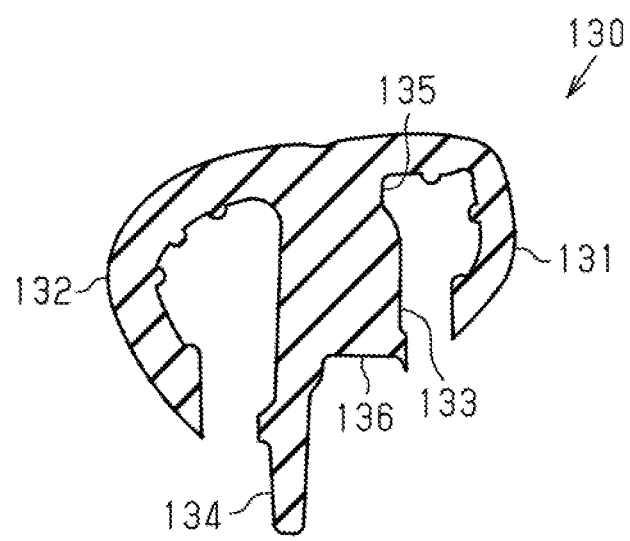
FIG. 5 is an arrow end view of a V-V line in FIG. 3.
Figure 6:
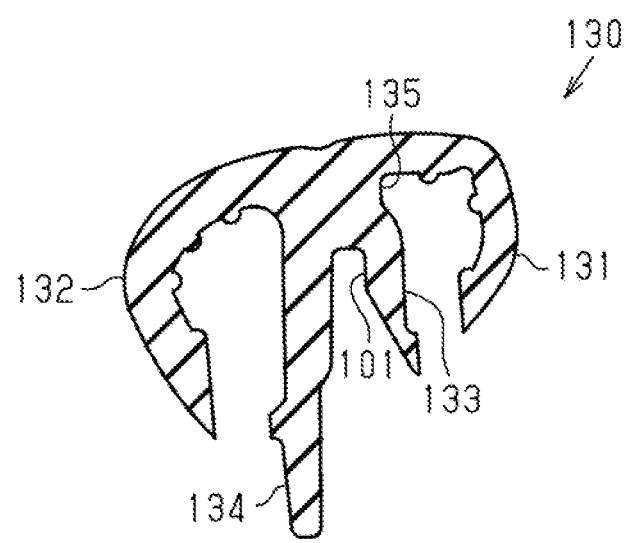
FIG. 6 is an arrow end view of a VI-VI line in FIG. 3.

Next, the weather strip 100 will be described with reference to FIGS. 1 and 3 to 6. Note that FIGS. 4 to 6 are cross-sectional views based on arrow lines illustrated in FIG. 3, but FIGS. 4 to 6 are illustrated by rotating 180 degrees about an axis orthogonal to a page space as the center for facilitating understanding of the description.

As illustrated in FIG. 1, the weather strip 100 has a quadrangular frame shape corresponding to a shape of the roof opening 22. Further, the weather strip 100 has four corners being curved in an arc shape. In the following description, description is given with reference to one corner of the four corners of the weather strip 100.

Figure 3:
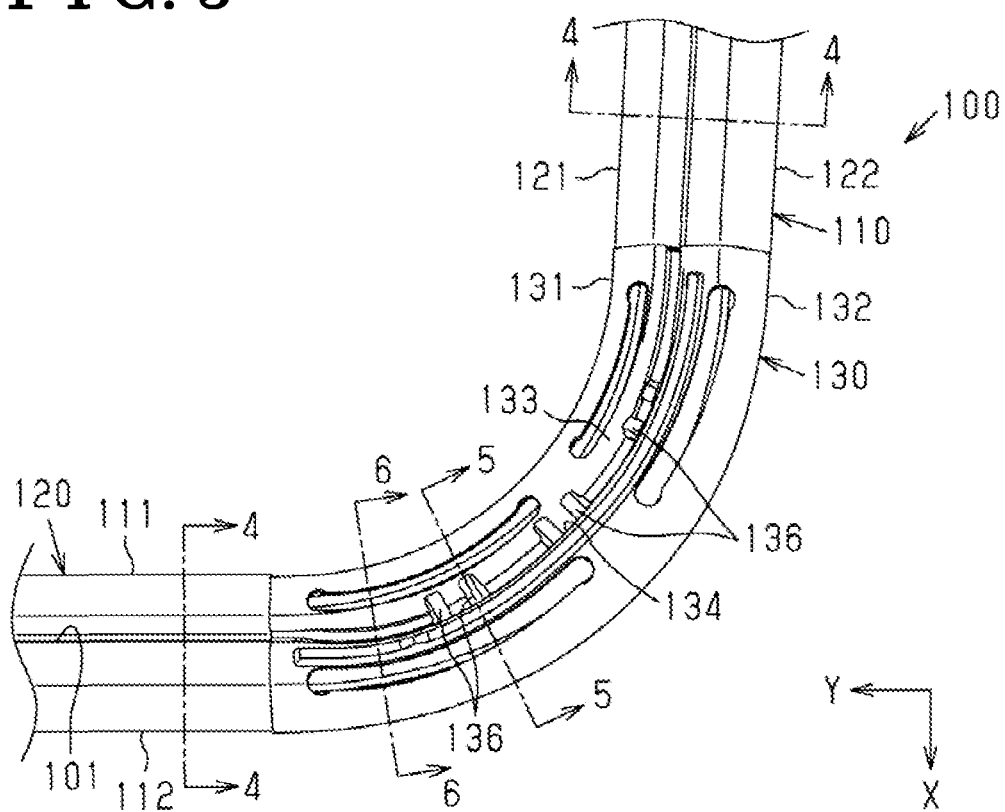
FIG. 3 is a partial bottom view of a weather strip of the sunroof unit.

As illustrated in FIG. 3, the weather strip 100 includes a holding groove 101 into which the flange 90 is inserted in the circumferential direction. Further, the weather strip 100 includes a first portion 110 extending in the width direction, a second portion 120 extending in the front-rear direction, and a third portion 130 that connects the first portion 110 and the second portion 120 adjacent to each other. The first portion 110 is a portion attached to the linear portion of the front flange and the linear portion 52 of the rear flange 51. The second portion 120 is a portion inserted into the side flange 61. The third portion 130 is a portion attached to the curved portion of the front flange and the curved portion 53 of the rear flange 51.

Figure 4:
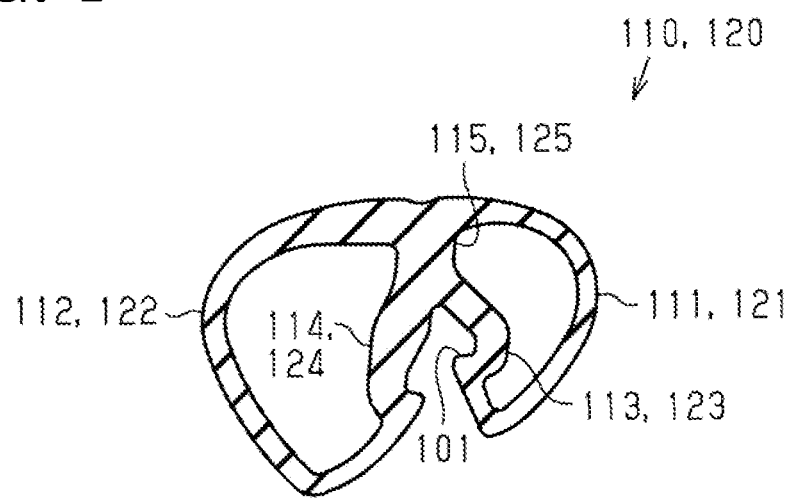
FIG. 4 is an arrow end view of a IV-IV line in FIG. 3.

As illustrated in FIGS. 3 and 4, the first portion 110 of the weather strip 100 includes an inner seal portion 111 in contact with the fixed panel 80, an outer seal portion 112 in contact with the vehicle body 20, an inner wall 113 in contact with an inner surface of the flange 90, an outer wall 114 in contact with an outer surface of the flange 90, and a bottom wall 115 that connects the inner wall 113 and the outer wall 114. Similarly, the second portion 120 of the weather strip 100 includes an inner seal portion 121 in contact with the fixed panel 80, an outer seal portion 122 in contact with the vehicle body 20, an inner wall 123 in contact with the inner surface of the flange 90, an outer wall 124 in contact with the outer surface of the flange 90, and a bottom wall 125 that connects the inner wall 123 and the outer wall 124.

As illustrated in FIG. 4, in the first portion 110 and the second portion 120 of the weather strip 100, the inner seal portions 111 and 121 and the outer seal portions 112 and 122 have a substantially C-shape as a cross-sectional shape orthogonal to the long-side direction. In a cross-sectional view orthogonal to the long-side direction, the inner seal portions 111 and 121 are connected to a tip of the inner walls 113 and 123 and the bottom walls 115 and 125 with a space between the inner walls 113 and 123 and the inner seal portions 111 and 121. The outer seal portions 112 and 122 are connected to a tip of the outer walls 114 and 124 and the bottom walls 115 and 125 with a space between the outer walls 114 and 124 and the outer seal portions 112 and 122. Then, the inner seal portions 111 and 121 and the outer seal portions 112 and 122 are configured in such a way as to be able to be flexibly deformed with respect to an external force.

The inner walls 113 and 123 and the outer walls 114 and 124 face each other across the holding groove 101. An interval between the inner walls 113 and 123 and the outer walls 114 and 124 is preferably smaller than a thickness of the flange 90. The bottom walls 115 and 125 connect base ends of the inner walls 113 and 123 and the outer walls 114 and 124 to each other. The bottom walls 115 and 125 together with the inner walls 113 and 123 and the outer walls 114 and 124 face the holding groove 101.

In the first portion 110 and the second portion 120 of the weather strip 100, the inner seal portions 111 and 121 and the outer seal portions 112 and 122 are a portion that blocks a gap between the vehicle body 20 and the fixed panel 80. Thus, the inner seal portions 111 and 121 and the outer seal portions 112 and 122 preferably have a relatively low coefficient of elasticity in such a way as to be able to be flexibly deformed. On the other hand, in the first portion 110 and the second portion 120 of the weather strip 100, the inner walls 113 and 123, the outer walls 114 and 124, and the bottom walls 115 and 125 are a portion attached to the flange 90. Thus, the inner walls 113 and 123, the outer walls 114 and 124, and the bottom walls 115 and 125 preferably have a relatively high coefficient of elasticity in such a way as to be able to hold an attitude of the weather strip 100 with respect to the flange 90. In other words, a coefficient of elasticity of the inner seal portions 111 and 121 and the outer seal portions 112 and 122 is smaller than a coefficient of elasticity of the inner walls 113 and 123, the outer walls 114 and 124, and the bottom walls 115 and 125.

Note that the first portion 110 and the second portion 120 of the weather strip 100 are preferably formed of an elastomer such as resin and rubber having excellent weatherproofness and waterproofness. For example, in the first portion 110 and the second portion 120 of the weather strip 100, the inner seal portions 111 and 121 and the outer seal portions 112 and 122 may be formed of ethylene propylene diene rubber (EPDM) including a hole, and the inner walls 113 and 123, the outer walls 114 and 124, and the bottom walls 115 and 125 may be formed of EPDM without including a hole. In this case, the inner seal portions 111 and 121 and the outer seal portions 112 and 122 are a porous material, i.e., spongy, and thus have a coefficient of elasticity lower than that of the inner walls 113 and 123, the outer walls 114 and 124, and the bottom walls 115 and 125. However, it is assumed that the inner seal portions 111 and 121 and the outer seal portions 112 and 122 have a porosity to the extent that liquid does not pass in terms of a function of the weather strip 100. Further, the first portion 110 and the second portion 120 of the weather strip 100 allow extrusion molding to be easily performed in a point of having a linear shape even when the inner seal portions 111 and 121 and the outer seal portions 112 and 122 are formed of a material different from that of the inner walls 113 and 123, the outer walls 114 and 124, and the bottom walls 115 and 125.

As illustrated in FIGS. 3, 5, and 6, the third portion 130 of the weather strip 100 includes an inner seal portion 131 in contact with the fixed panel 80 and an outer seal portion 132 in contact with the vehicle body 20. Further, the third portion 130 includes an inner wall 133 in contact with the inner surface of the flange 90, an outer wall 134 in contact with the outer surface of the flange 90, a bottom wall 135 that connects the inner wall 133 and the outer wall 134, and a plurality of connection walls 136 that connect the inner wall 133 and the outer wall 134.

As illustrated in FIGS. 5 and 6, in the third portion 130 of the weather strip 100, the inner seal portion 131 and the outer seal portion 132 have a substantially arc shape as a cross-sectional shape orthogonal to the long-side direction. In the cross-sectional view orthogonal to the long-side direction, the inner seal portion 131 is connected to the bottom wall 135 with a space between the inner wall 133 and the inner seal portion 131, and the outer seal portion 132 is connected to the bottom wall 135 with a space between the outer wall 134 and the outer seal portion 132. Then, the inner seal portion 131 and the outer seal portion 132 are configured in such a way as to be able to be flexibly deformed with respect to an external force.

The inner wall 133 and the outer wall 134 have a flat plate shape. The inner wall 133 and the outer wall 134 face each other across the holding groove 101. An interval between the inner wall 133 and the outer wall 134 is preferably smaller than a thickness of the flange 90. The inner wall 133 is longer than the outer wall 134. The bottom wall 135 connects base ends of the inner wall 133 and the outer wall 134 to each other. As illustrated in FIG. 6, the bottom wall 135 together with the inner wall 133 and the outer wall 134 face the holding groove 101. As illustrated in FIGS. 3 and 5, the connection wall 136 extends from the bottom wall 135 toward the tip of the inner wall 133 and the outer wall 134, and connects the inner wall 133 and the outer wall 134. Thus, the holding groove 101 is shallower in a portion with the connection wall 136 than in a portion without the connection wall 136.

As illustrated in FIG. 3, two connection walls 136 are provided in pair in a position corresponding to one notch 54 of the curved portion 53 of the rear flange 51. The pair of the connection walls 136 are disposed at an interval in the long-side direction of the third portion 130. Thus, a gap is provided between the pair of the connection walls 136.

It is difficult to perform extrusion molding on the third portion 130 of the weather strip 100 in a point of being curved. Particularly, it is more difficult to perform extrusion molding on the third portion 130 of the weather strip 100 according to the present embodiment in a point of having a small curvature radius in order to increase an area of the movable panel 70 and the fixed panel 80. Thus, in contrast to the first portion 110 and the second portion 120 of the weather strip 100, the third portion 130 of the weather strip 100 needs to be molded by disposing and injecting a raw material into a die. Therefore, in contrast to the first portion 110 and the second portion 120 of the weather strip 100, the entire portion of the third portion 130 of the weather strip 100 is preferably formed of the same material.

Herein, when the entire portion of the third portion 130 of the weather strip 100 has a high coefficient of elasticity, a sealing property may decrease in a point that the inner seal portion 131 and the outer seal portion 132 cannot be flexibly deformed. Thus, a coefficient of elasticity of the third portion 130 of the weather strip 100 is preferably low. Specifically, a coefficient of elasticity of the third portion 130 of the weather strip 100 is preferably a coefficient of elasticity equal to that of the inner seal portions 111 and 121 and the outer seal portions 112 and 122 in the first portion 110 and the second portion 120 of the weather strip 100. In other words, a material of the third portion 130 of the weather strip 100 is preferably equal to a material of the inner seal portions 111 and 121 and the outer seal portions 112 and 122 in the first portion 110 and the second portion 120 of the weather strip 100.

Next, one example of a method of manufacturing the weather strip 100 will be described.

The method of manufacturing the weather strip 100 includes a first molding step of individually performing extrusion molding on the first portion 110 and the second portion 120, and a second molding step of molding the third portion 130 in a die in which an end portion of the first portion 110 and an end portion of the second portion 120 are disposed. In the second molding step, the first portion 110 and the second portion 120 are connected to each other with the third portion 130. The method of manufacturing the weather strip 100 further includes a third molding step of curing the first portion 110, the second portion 120, and the third portion 130 after the second molding step, depending on a material of the weather strip 100. When a material of the weather strip 100 is EPDM, heating for bridging is performed as the third molding step.

Action of the present embodiment will be described.

Figure 7:
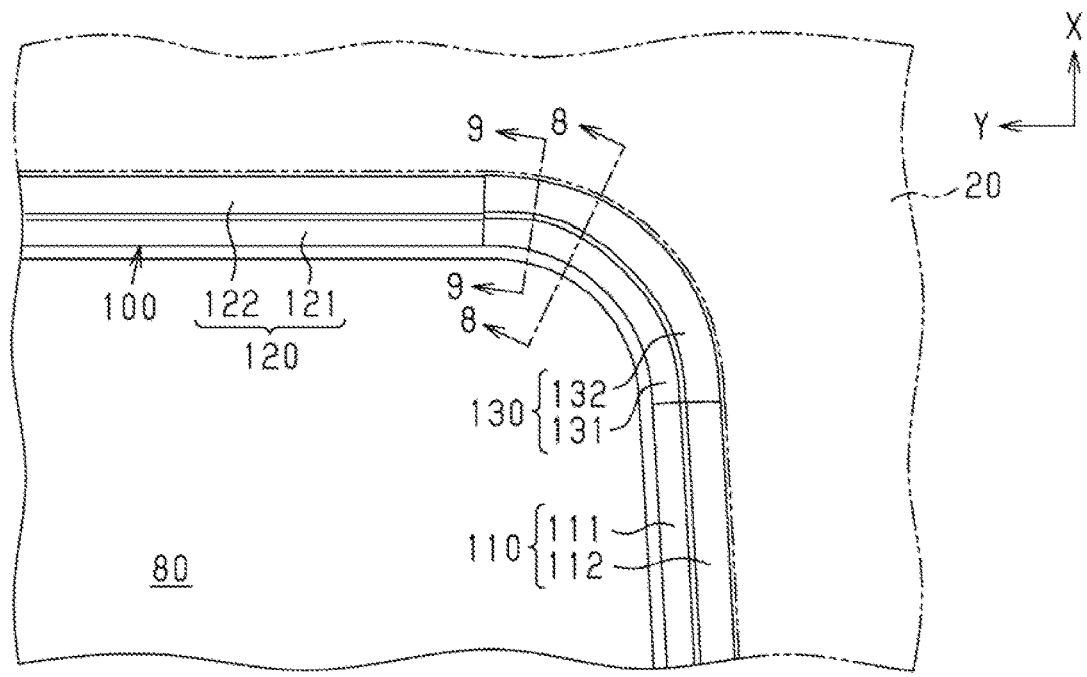
FIG. 7 is a partial plan view of the vehicle.

FIG. 7 illustrates a state where the weather strip 100 is installed on the flange 90, and a state where the weather strip 100 blocks a gap generated between the vehicle body 20 and the fixed panel 80.

In the first portion 110 and the second portion 120 of the weather strip 100, the inner wall 113 and the outer wall 114 having a high coefficient of elasticity sandwich the flange 90, and thus an attitude of the first portion 110 and the second portion 120 with respect to the flange 90 becomes stable. In other words, during assembly of the fixed panel 80 and during assembly of the sunroof unit 30 to the vehicle body 20, even when a load acts on the first portion 110 and the second portion 120 of the weather strip 100, the first portion 110 and the second portion 120 are less likely to be relatively displaced with respect to the flange 90. In other words, the first portion 110 and the second portion 120 of the weather strip 100 can appropriately block a gap generated between the vehicle body 20 and the fixed panel 80.

Figure 8:
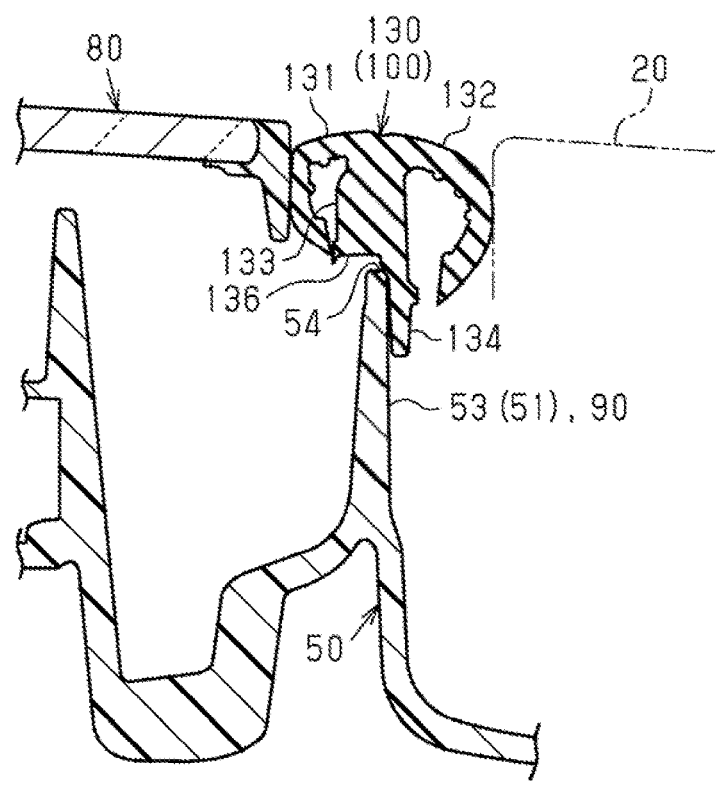
FIG. 8 is an arrow cross-sectional view of an VIII-VIII line in FIG. 7.
Figure 9:
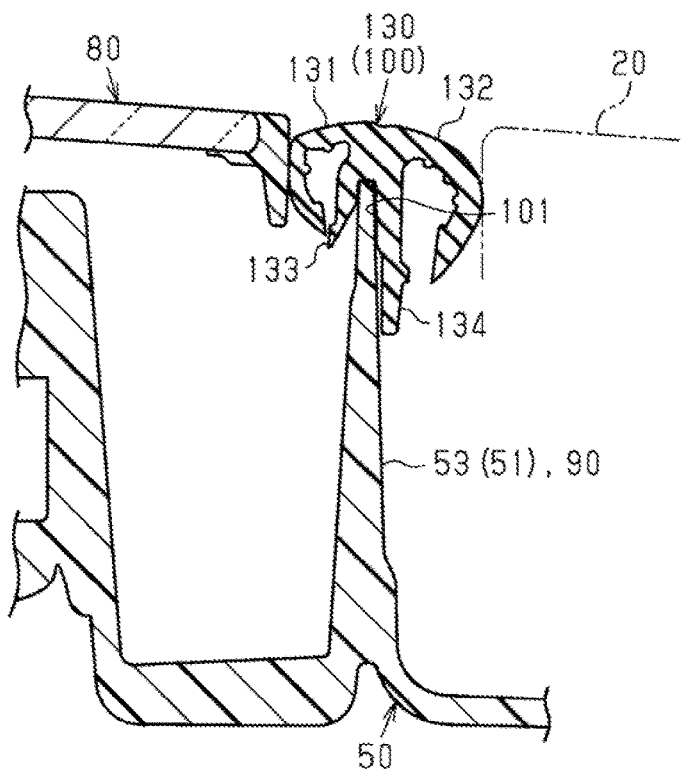
FIG. 9 is an arrow cross-sectional view of a IX-IX line in FIG. 7.

In contrast, as illustrated in FIGS. 8 and 9, in the third portion 130 of the weather strip 100, in addition to sandwiching the flange 90 between the inner wall 133 and the outer wall 134, the pair of the connection walls 136 are disposed on the notch 54 of the flange 90. Thus, even when a coefficient of elasticity of the third portion 130 of the weather strip 100 is a coefficient of elasticity equal to that of the inner seal portion 111 and the outer seal portion 112 in the first portion 110 and the second portion 120 of the weather strip 100, an attitude of the third portion 130 with respect to the flange 90 becomes stable. Specifically, even when the fixed panel 80 pushes down the inner seal portion 131 of the third portion 130 during assembly of the fixed panel 80, the inner seal portion 131 is less likely to be relatively displaced with respect to the flange 90. For example, the inner seal portion 131 is less likely to rotate and be displaced about an axis line extending in the long-side direction of the third portion 130. Further, even when the vehicle body 20 pushes down the outer seal portion 132 of the second portion 120 during assembly of the sunroof unit 30 to the vehicle body 20 from below, the outer seal portion 132 is less likely to be relatively displaced with respect to the flange 90. For example, the outer seal portion 132 is less likely to rotate and be displaced about the axis line extending in the long-side direction of the third portion 130. In this way, the third portion 130 of the weather strip 100 can appropriately block a gap generated between the vehicle body 20 and the fixed panel 80.

Effects of the present embodiment will be described.

(1) In a state where the weather strip 100 is attached to the flange 90, the connection wall 136 of the weather strip 100 is located on the portion in which the notch 54 of the flange 90 is formed. Thus, even when a load acts on the weather strip 100, the weather strip 100 is less likely to be relatively displaced with respect to the flange 90. In this way, the seal structure can stabilize, with a simple configuration, an attitude of the weather strip 100 with respect to the flange 90.

(2) In the weather strip 100, a load is more likely to act on the third portion 130 installed on the curved portion 53 of the flange 90 from many directions than the first portion 110 and the second portion 120 installed on the linear portion 52 of the flange 90, and an attitude of the third portion 130 with respect to the flange 90 is more likely to become unstable. In this respect, since the curved portion 53 includes the notch 54, the seal structure can suppress instability of an attitude of the third portion 130 installed on the curved portion 53 of the weather strip 100.

(3) The plurality of notches 54 can be easily formed by resin-molding the front housing 40 and the rear housing 50.

Further, a structure of the weather strip 100 is simplified in a point that the third portion 130 of the weather strip 100 is molded by a single material.

The present embodiment can be performed by making a modification as follows. The present embodiment and the following modification example can be combined as long as they are not technically inconsistent.

Figure 10:
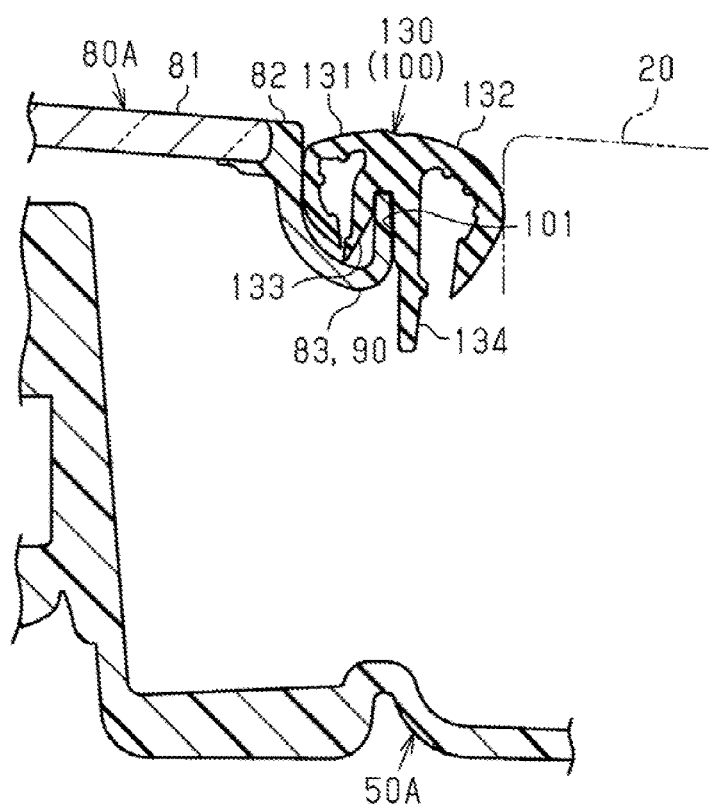
FIG. 10 is a partial cross-sectional view of a vehicle according to a modification example.

As illustrated in FIG. 10, a fixed panel 80A may include a panel body 81 formed of glass and the like, and a covering portion 82 that covers a peripheral edge of the panel body 81. In this case, it is preferable that the covering part 82 includes a panel flange 83 (90) extending along an opening edge of a roof opening 22, and a rear housing 50A does not include a rear flange 51. A weather strip 100 is installed on the panel flange 83 of the fixed panel 80A. In this way, when the weather strip 100 can be disposed between a vehicle body 20 and the fixed panel 80 and 80A, the flange 90 may be a configuration on the vehicle body 20 side or may be a configuration on the fixed panel 80A side.

A shape of the flange 90 and a shape of the weather strip 100 can be appropriately changed.

The number of the notches 54 of the flange 90 and the number of the connection walls 136 of the weather strip 100 can be appropriately changed. For example, one connection wall 136 may be associated with one notch 54.

The notch 54 may be provided in the linear portion 52 of the flange 90. In this case, in the weather strip 100, the connection wall 136 is provided on a portion of the flange 90 corresponding to the notch 54 of the linear portion 52.

The seal structure may be applied to an "opening" different from the roof opening 22. For example, the seal structure may be applied to a door opening as one example of an "opening" opened and closed by a side door and a back door that serve as one example of a "closing body".

A seal structure of a vehicle opening that solves the problem described above is applied to a vehicle including a vehicle body that includes an opening, and a closing body that closes the opening, and the seal structure of a vehicle opening includes a flange extending along an opening edge of the opening, and a weather strip that includes a holding groove into which the flange is inserted, and blocks a gap generated between the vehicle body and the closing body. A tip of the flange includes a plurality of notches with respect to an extending direction of the flange. The weather strip includes an inner wall and an outer wall facing each other across the holding groove, and a plurality of connection walls that connect the inner wall and the outer wall in a position corresponding to the plurality of notches.

In the seal structure of a vehicle opening having the configuration described above, in a state where the weather strip is attached to the flange, the connection wall of the weather strip is located on a portion in which the notch of the flange is formed. Thus, when a load acts on the weather strip, the weather strip is less likely to be relatively displaced with respect to the flange. In this way, the seal structure of a vehicle opening can stabilize, with a simple configuration, an attitude of the weather strip with respect to the flange.

In the sealing structure of a vehicle opening described above, the flange may include a first linear portion and a second linear portion that form a linear shape, and a curved portion that forms an arc shape and also connects the first linear portion and the second linear portion, and the curved portion may include the plurality of notches.

In the weather strip, a load is more likely to act on a portion installed on the curved portion from many directions than a portion installed on the first linear portion and the second linear portion, and an attitude of the portion installed on the curved portion with respect to the flange is more likely to become unstable. In this respect, since the curved portion includes the notch, the seal structure of a vehicle opening having the configuration described above can suppress instability of an attitude of the portion of the weather strip being installed on the curved portion.

In the seal structure of a vehicle opening, the flange may be formed of resin.

In the seal structure of a vehicle opening having the configuration described above, the plurality of notches can be easily formed by resin-molding the flange, for example.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seal structure of a vehicle opening being applied to a vehicle including a vehicle body that includes an opening, and a closing body that closes the opening, the seal structure of a vehicle opening comprising:
   a flange extending along an opening edge of the opening; and
   a weather strip that includes a holding groove into which the flange is inserted, and blocks a gap generated between the vehicle body and the closing body, wherein
   a tip of the flange includes a plurality of notches and at least one projection disposed along an extending direction of the flange,
   the at least one projection is disposed along the flange in-between a respective adjacent pair of the notches,
   each of the notches extends downwards from an upper end of the tip of the flange and defines an open space along the upper end of the tip of the flange,
   the weather strip includes an inner wall and an outer wall facing each other across the holding groove, and a plurality of connection walls that connect the inner wall and the outer wall in a position corresponding to the plurality of notches,
   the holding groove includes at least one projection-receiving portion,
   the at least one projection-receiving portion is disposed in-between a respective adjacent pair of the connection walls,
   the at least one projection-receiving portion receives the at least one of projection, and
   each of the connection walls is disposed in a respective one of the notches.

2. The sealing structure of a vehicle opening according to claim 1, wherein
   the flange includes a first linear portion and a second linear portion that each form a respective linear shape, and a curved portion that forms an arc shape and also connects the first linear portion and the second linear portion, and
   the curved portion includes the plurality of notches.

3. The seal structure of a vehicle opening according to claim 1, wherein the flange is formed of resin.

4. The seal structure of a vehicle opening according to claim 2, wherein the flange is formed of resin.

5. A seal structure of a vehicle opening being applied to a vehicle including a vehicle body that includes an opening, and a closing body that closes the opening, the seal structure of a vehicle opening comprising:
   a flange extending along an opening edge of the opening; and
   a weather strip that includes a holding groove into which the flange is inserted, and blocks a gap generated between the vehicle body and the closing body, wherein
   a tip of the flange includes a plurality of notches with respect to an extending direction of the flange,
   the weather strip includes an inner wall and an outer wall facing each other across the holding groove, and a plurality of connection walls that connect the inner wall and the outer wall in a position corresponding to the plurality of notches,
   the closing body is a fixed panel including a panel body and a covering portion that covers the panel body, and
   the weather strip is installed on a panel flange in the covering portion.

6. The seal structure of a vehicle opening according to claim 1, wherein
   the at least one projection comprises a plurality of projections,
   the at least one projection receiving portion comprises a plurality of projection receiving portions,
   each of the projection receiving portions is disposed in-between the respective adjacent pair of the connection walls, and
   each of the projection receiving portions receives a respective one of the projections.

7. The seal structure of a vehicle opening according to claim 6, wherein each of the notches has a substantially rectangular shape when viewed from an outer side of the flange.

8. The seal structure of a vehicle opening according to claim 1, wherein each of the notches has a substantially rectangular shape when viewed from an outer side of the flange.

* * * * *